US012776634B2

(12) United States Patent

Xie

(10) Patent No.: US 12,776,634 B2

(45) Date of Patent: Oct. 27, 2026

(54) CABLE WINDING STRUCTURE

(71) Applicant: Weiyu (Shenzhen) Technology Co., Ltd., Shenzhen (CN)

(72) Inventor: Xianbang Xie, Shenzhen (CN)

(73) Assignee: Weiyu (Shenzhen) Technology Co., Ltd., Shenzhen (CN)

( * ) Notice: Subject to any disclaimer, the term of this patent is extended or adjusted under 35 U.S.C. 154(b) by 441 days.

(21) Appl. No.: 18/386,625

(22) Filed: Nov. 3, 2023

(65) Prior Publication Data

US 2025/0015583 A1 Jan. 9, 2025

(30) Foreign Application Priority Data

Jul. 7, 2023 (CN) ......................... 202310840450.0

(51) Int. Cl.

*H02G 11/02* (2006.01)
*B65H 75/44* (2006.01)

(52) U.S. Cl.

CPC ............. *H02G 11/02* (2013.01); *B65H 75/44* (2013.01); *B65H 75/4471* (2013.01)

(58) Field of Classification Search

CPC ...... H02G 11/02; H02G 11/006; H02G 11/00; B65H 2701/34; B65H 75/486; B65H 75/4471; B65H 75/44

See application file for complete search history.

(56) References Cited

U.S. PATENT DOCUMENTS

| | | | | | |
|---|---|---|---|---|---|
| 3,378,214 | A * | 4/1968 | Hilsinger, Jr. | H02G 11/02 | 160/300 |
| 3,528,624 | A * | 9/1970 | Tamarin | H02G 11/02 | 242/385.1 |
| 3,596,849 | A * | 8/1971 | Tamarin | H02G 11/02 | 242/385.1 |
| 3,630,466 | A * | 12/1971 | Kindermann | H02G 11/02 | 242/385.3 |
| 3,848,827 | A * | 11/1974 | Tamarin | B65H 75/4434 | 242/385.1 |
| 6,484,958 | B1 * | 11/2002 | Xue | H02G 11/02 | 242/378.1 |
| 8,882,016 | B1 * | 11/2014 | Melvin | B65H 75/4492 | 242/405 |

(Continued)

FOREIGN PATENT DOCUMENTS

| | | | | |
|---|---|---|---|---|
| CN | 2804026 Y | * | 8/2006 | B65H 75/4434 |
| CN | 207149817 U | * | 3/2018 | G01R 15/125 |
| KR | 102549037 B1 | * | 6/2023 | B65H 75/4428 |

*Primary Examiner* — Cheng Lin

(57) ABSTRACT

Disclosed is a cable winding structure, including: an accommodating space, formed between a bottom shell and a rotating disc and configured to accommodate a wound cable; a limiting track, distributed on an inner wall of a surface shell; and a reset magnet and a magnetic toggle wheel, arranged on a surface of the rotating disc, where when the cable is pulled by an external force, the magnetic toggle wheel rotates with the rotating disc and abuts against the limiting track, where the reset magnet is configured to adjust a swing position of the magnetic toggle wheel that abuts against the limiting track to a position the same as that at which the magnetic toggle wheel does not abut against the limiting track. The cable winding structure can easily implement winding and storage of the cable, and make it convenient for a user to control an outlet length of the cable.

10 Claims, 2 Drawing Sheets

(56) References Cited

U.S. PATENT DOCUMENTS

| | | | | |
|---|---|---|---|---|
| 10,556,773 | B2 * | 2/2020 | Tang | B65H 75/48 |
| 10,707,668 | B2 * | 7/2020 | Sano | B60R 16/027 |
| 2003/0057047 | A1 * | 3/2003 | Jin | F16D 41/12 192/84.3 |
| 2005/0155830 | A1 * | 7/2005 | Huang | H02G 11/02 191/12.2 R |
| 2007/0045073 | A1 * | 3/2007 | Cao | H02G 11/02 191/12.2 R |
| 2013/0153701 | A1 * | 6/2013 | Huang | B65H 75/4431 242/385.2 |
| 2014/0299704 | A1 * | 10/2014 | Hollowed | H02G 11/02 242/371 |
| 2017/0275133 | A1 * | 9/2017 | Chen | B65H 75/486 |
| 2019/0382230 | A1 * | 12/2019 | Hamada | B60R 16/027 |

* cited by examiner

CABLE WINDING STRUCTURE

CROSS REFERENCES TO RELATED APPLICATION

This application claims priority of Chinese Patent Application No. 202310840450.0 filed on Jul. 7, 2023, the entire contents of which are hereby incorporated by reference.

TECHNICAL FIELD

This application relates to the field of winding technologies, and in particular, to a cable winding structure.

BACKGROUND

In different scenarios, different lengths of cables, such as data cables, are required. For example, when a longer charging cable is required when a socket is farther away. However, an existing cable winding structure is not convenient enough for controlling a length of a cable, and requires control by a motor, to retract and pull the cable of a required length. In view of this, there is a need to provide a simpler and more reliable cable winding structure to implement free retraction and release of cables.

SUMMARY

Embodiments of this application provide a cable winding structure, configured to conveniently retract and pull a cable.

An embodiment of this application provides a cable winding structure, including: a bottom shell, a rotating disc, and a surface shell that are sequentially arranged opposite to each other, where the surface shell covers the bottom shell;

an accommodating space, formed between the bottom shell and the rotating disc and configured to accommodate a wound cable;

a limiting track of a preset length, distributed on an inner wall of the surface shell; and a reset magnet and a magnetic toggle wheel, arranged on a surface of the rotating disc, where when the cable is pulled by an external force, the magnetic toggle wheel rotates with the rotating disc, and abuts against the limiting track that the magnetic toggle wheel passes, where the reset magnet is configured to adjust a swing position of the magnetic toggle wheel that abuts against an end of the limiting track to a position the same as that at which the magnetic toggle wheel does not abut against the end of the limiting track.

Optionally, the reset magnet is two magnets whose magnetic poles have a same name and that are arranged axially symmetrically with respect to the magnetic toggle wheel; and the magnetic poles of the reset magnet and the magnetic toggle wheel are the same.

Optionally, the swing position of the magnetic toggle wheel is limited between mounting positions of the two reset magnets on the left and the right; and when the magnetic toggle wheel does not abut against the limiting track, the magnetic toggle wheel faces toward a direction of a midline formed between the two reset magnets, and faces away from a center of a circle of the rotating disc.

Optionally, one end of the magnetic toggle wheel is a rounded structure, and an other end of the magnetic toggle wheel is a sharp-cornered structure, where the rounded structure is arranged on the surface of the rotating disc through a rotation pivot, where the rotation pivot is located in a midline region formed between the two reset magnets; and a dimension of the sharp-cornered structure is adapted to a track gauge of the limiting track, to enable the cable to be stuck by the limited rotating disc.

Optionally, a magnet with same magnetic poles as those of the reset magnet is mounted inside the sharp-cornered structure.

Optionally, a connecting column is arranged on a middle portion of the bottom shell, and the connecting column penetrates through the rotating disc and bears the surface shell.

Optionally, a winding mechanism is wound around a section of the connecting column that is located in the accommodating space, and the winding mechanism is configured to cooperate with the rotating disc to increase or reduce a length by which the cable is wound.

Optionally, the bottom shell and the surface shell cover each other through a snap-fit structure; and an opening for extending or retracting the cable is provided on a shell wall of the bottom shell and a shell wall of the surface shell.

Optionally, the snap-fit structure includes a recessed portion and a protruding portion that interlock with each other.

Optionally, the bottom shell, the rotating disc, and the surface shell are all made of plastic.

It can be learned from the foregoing technical solutions that the embodiments of this application have at least the following advantages.

The limiting track on the inner wall of the surface shell has a limiting effect on the magnetic toggle wheel, so that a specific length of the cable is stuck outside the accommodating space, to satisfy an actual cable length requirement of a user. When the cable needs to be wound and retracted, the magnetic toggle wheel can be separated from the limiting track by pulling the cable, and under the action of a magnetic force of the reset magnet, the magnetic toggle wheel may return to the swing position at which the magnetic toggle wheel does not abut against the limiting track, so that a specific length of the cable can be conveniently stuck or retracted a next time by limiting the magnetic toggle wheel. Therefore, the cable winding structure in the embodiments of this application can easily implement winding and storage of the cable, and make it convenient for a user to control an outlet length of the cable.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some embodiments of this application, and an ordinary person skilled in the art may still derive other drawings from these accompanying drawings.

REFERENCE NUMERALS

1: bottom shell; 11: connecting column; 12: protruding portion; 2: surface shell; 21: limiting track; 3: cable; 4:

rotating disc; 41: reset magnet; 42: magnetic toggle wheel; 421: sharp-cornered structure or pointed end; 43: rotation pivot; and 5: winding mechanism.

DETAILED DESCRIPTION

In order to enable a person skilled in the art to better under the solutions of this application, the following clearly and completely describes the technical solutions of the embodiments of this application with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

In descriptions of the embodiments of this application, it should be noted that, in the embodiments of this application, orientation or location relationships indicated by terms "center", "above", "below", "left", "right", "vertical", "horizontal", "inner", "outer", and the like (if exists) are based on orientation or location relationships shown in the accompanying drawings, and are merely intended for conveniently describing the embodiments of this application and simplifying descriptions, rather than indicating or implying that an apparatus or element needs to have a particular orientation, or needs to be constructed and operated in a particular orientation, and therefore cannot be construed as a limitation on the embodiments of this application. In addition, terms such as "first", "second", and "third" are used only for description purposes such as distinguishing between similar objects and shall not be construed as indicating or implying relative importance or order.

In descriptions of the embodiments of this application, it should be noted that, unless otherwise explicitly specified or defined, terms such as "mount", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand specific meanings of the foregoing terms in the embodiments of this application according to specific situations.

Figure 1:
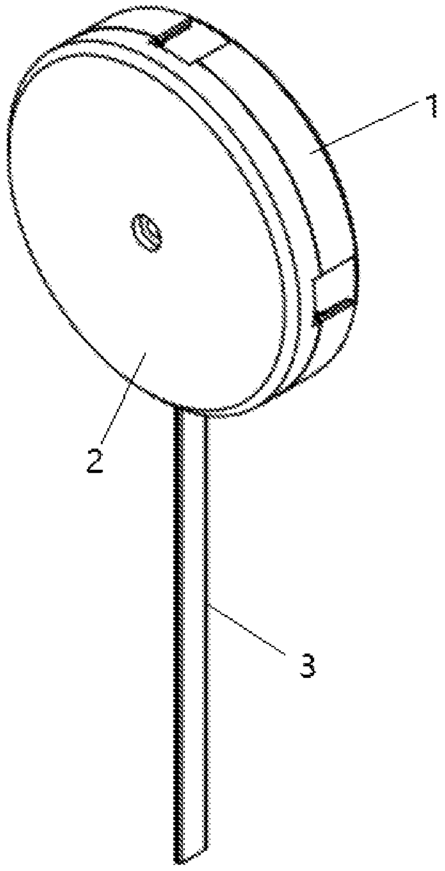
FIG. 1 is an overall schematic diagram of a cable winding structure according to an embodiment of this application.
Figure 2:
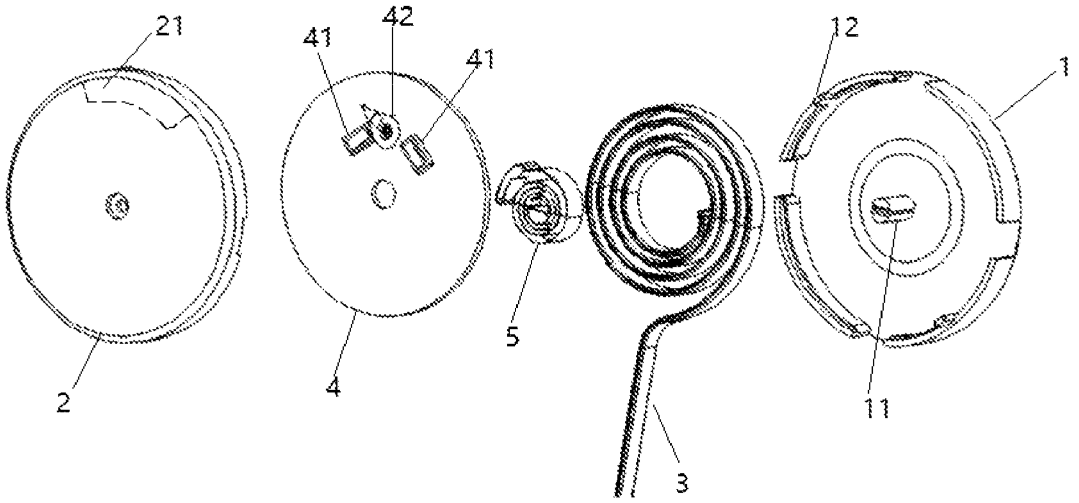
FIG. 2 is a schematic exploded view of a cable winding structure according to an embodiment of this application.

Referring to FIG. 1 and FIG. 2, this application provides an embodiment of a cable winding structure, including:

- a bottom shell 1, a rotating disc 4, and a surface shell 2 that are sequentially arranged opposite to each other, where the surface shell 2 covers the bottom shell 1; an accommodating space formed between the bottom shell 1 and the rotating disc 4 is configured to accommodate a wound cable 3; a limiting track 21 of a preset length is distributed on an inner wall of the surface shell 2; and a reset magnet 41 and a magnetic toggle wheel 42 are arranged on a surface of the rotating disc 4, and when the cable 3 is pulled by an external force, the magnetic toggle wheel 42 rotates with the rotating disc 4 and abuts against the limiting track 21 that the magnetic toggle wheel 42 passes, where the reset magnet 41 is configured to adjust a swing position of the magnetic toggle wheel 42 that abuts against an end of the limiting track 21 to a position the same as that at which the magnetic toggle wheel does not abut against the end of the limiting track.

The limiting track 21 on the inner wall of the surface shell 2 has a limiting effect on the magnetic toggle wheel 42, a specific length of the cable 3 is stuck outside the accommodating space, to satisfy an actual cable length requirement of a user. When the cable needs to be wound and retracted, the magnetic toggle wheel 42 can be separated from the limiting track 21 by pulling the cable 3, and under the action of a magnetic force of the reset magnet 41, the magnetic toggle wheel 42 may return to the swing position (referred to as returning to an original swing position) at which the magnetic toggle wheel 42 does not abut against the limiting track 21, so that a specific length of the cable 3 can be conveniently stuck or retracted a next time by limiting the magnetic toggle wheel. In view of the above, the cable winding structure in the embodiments of this application can conveniently implement winding of the cable 3 in the accommodating space. In addition, through mutual magnetism (for example, a force of mutual repulsion or a force of mutual attraction) between the reset magnet 41 and the magnetic toggle wheel 42, it is convenient to freely control an outlet length of the cable 3.

Based on the foregoing descriptions of examples, some specific possible implementation examples are provided below, and in an actual application, implementation content in the examples may be combined and implemented as needed according to corresponding functions, principles, and application logic.

Figure 3:
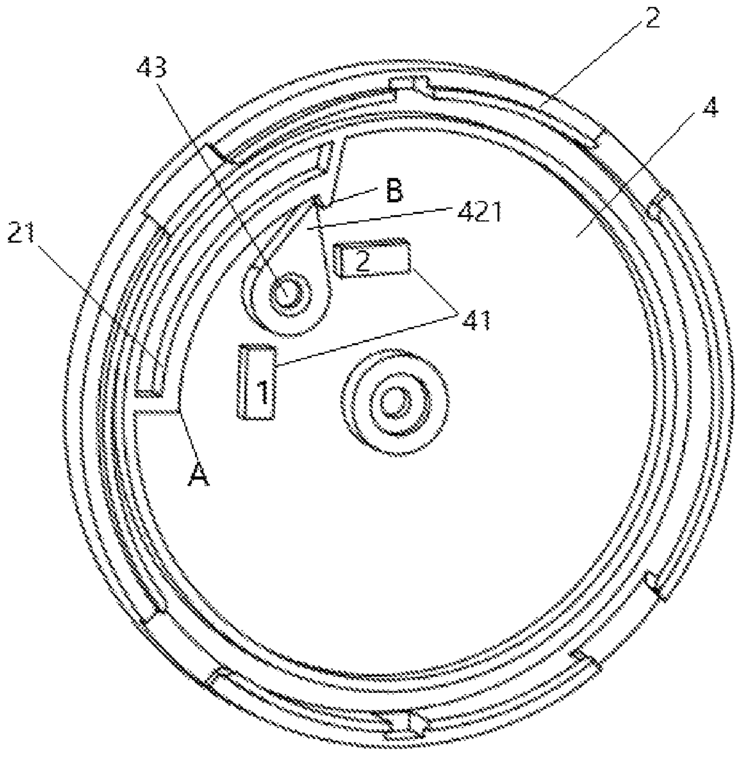
FIG. 3 is a schematic side view of a rotating disc according to an embodiment of this application.

As shown in FIG. 3, in some specific examples, the reset magnet 41 is two magnets whose magnetic poles have a same name and that are arranged axially symmetrically with respect to the magnetic toggle wheel 42. Preferably, magnetic poles of the reset magnet 41 and the magnetic toggle wheel 42 are the same, for example, are both N (north) poles or both S (south) poles. In an actual application, magnetic forces of the two reset magnets 41 may be the same or different, but the magnetic force generated by each reset magnet needs to be enough to affect, for example, repel, a magnetic force of the magnetic toggle wheel 42, so that the swing position or an orientation of the magnetic toggle wheel 42 changes after the magnetic toggle wheel 42 passes the limiting track 21, thereby departing from a limitation of the limiting track 21 and implementing retraction and pulling of the cable 3. Certainly, different from the foregoing case in which the magnetic poles are the same, the magnetic poles of the reset magnet 41 and the magnetic toggle wheel 42 may be different. In this case, the two reset magnets 41 may enable the magnetic toggle wheel 42 to return, for example, by mutual attractive forces, for example, enable the magnetic toggle wheel 42 to face toward a direction of a midline formed between the two reset magnets 41 and face away from a center of a circle of the rotating disc 4. To sum up, the magnetic poles of the magnetic toggle wheel 42 and the reset magnet 41 are not necessarily the same, as long as the magnetic force of the reset magnet 41 can enable the magnetic toggle wheel 42 near and limited by the limiting track 21 to depart from the limitation, and prevent (the pointed end of the magnetic toggle wheel 42 from) facing toward the center of the rotating disc 4, which may be specifically set according to actual situations.

It may be understood that in some specific examples, the swing position of the magnetic toggle wheel 42 is limited between mounting positions of the two reset magnets 41 on the left and the right. When the magnetic toggle wheel 42 does not abut against the limiting track 21, the magnetic toggle wheel 42 faces toward the direction of the midline formed between the two reset magnets 41, and faces away from the center of a circle of the rotating disc 4, which may be referred to as an original swing position facing toward the middle between the two reset magnets 41 and facing away from the center of a circle of the rotating disc 4. For example, a swing angle of the magnetic toggle wheel 42 falls within an angle area formed by the two reset magnets 41 on the left and right, and does not tightly abut against the reset magnet 41 due to repulsion between magnets of the same poles. When the magnetic toggle wheel 42 does not abut against the limiting track 21, angles formed between the magnetic toggle wheel 42 (at the original swing position) and the two reset magnets 41 on the left and right may be regarded as 120°, that is, the three are arranged symmetrically with each other.

In some specific examples, one end of the magnetic toggle wheel 42 is a rounded structure, and an other end of the magnetic toggle wheel 42 is a sharp-cornered structure 421. The rounded structure is arranged on a surface of the rotating disc 4 through a rotation pivot 43. Preferably, the rotation pivot 43 is located in a midline region formed between the two reset magnets 41. A dimension of the sharp-cornered structure 421 is adapted to a track gauge of the limiting track 21, to enable the cable 3 to be stuck by the limited rotating disc 4. For example, the magnetic toggle wheel 42 may be in a shape of a water drop as shown in FIG. 3, and as a whole, can rotate with the rotation pivot 43. An angle of the rotation is limited in the angle area formed between the mounting positions of the two reset magnets 41 on the left and the right. Such arrangement can effectively prevent the sharp-cornered structure 421 of the magnetic toggle wheel 42 from facing toward the center of the rotating disc 4, losing an opportunity of abutting against the limiting track 21, and preventing a required length of the cable 3 from being stuck outside the bottom shell 1 (that is, the cable fails to be stuck). Preferably, a magnet with the same magnetic pole as the reset magnet 41 is mounted inside the sharp-cornered structure 421, and certainly, a magnet with an opposite magnetic pole may alternatively be mounted.

Referring to FIG. 3, the reset magnet 41 and the magnetic toggle wheel 42 with the same magnetic poles are used as an example. The cable 3 can drive the rotating disc 4 to rotate under a pulling force of a hand, and the magnetic toggle wheel 42 and the reset magnet 41 on the rotating disc 4 also rotate accordingly, for example, rotate clockwise, to generate a scenario of Track 1. In a case that the magnetic toggle wheel 42 passes a section of the limiting track 21 with a length of AB, and the cable 3 is not pulled, an end of the sharp-cornered structure 421 (which may be referred to as a pointed end) of the magnetic toggle wheel 42 is limited in the limiting track 21. If the pointed end 421 is fixed on the right side of a start point A of the limiting track 21, a fixed outlet length of the cable 3 is stuck (that is, the cable is stuck), and rotation cannot be performed. Track 2: The cable 3 is pulled clockwise continuously, and the pointed end is toggled to a near-edge position at an end point B of the limiting track 21. In this case, the cable is further pulled, the pointed end 421 is subjected to a repulsive force of a same pole from a No. 1 reset magnet 41 on the left and ejected to the right, that is, departs from the limiting track 21, so that a state that the cable 3 is fixed in Track 1 fails (that is, the cable fails to be stuck), and then the cable can be pulled out from the bottom shell 1. Track 3: If the cable 3 is pulled back counterclockwise, specifically, the cable 3 may be pulled back through the internal torque of the cable winding structure (for example, the lever torque of the winding mechanism 5), the pointed end is toggled to a near-edge position at the start point A of the limiting track 21. In this case, the cable is further pulled, and the pointed end is subjected to a repulsive force of a same pole from a No. 2 reset magnet 41 on the right and ejected out to the left to return. The returning of the magnetic toggle wheel 42 may be understood as that the pointed end faces toward or the swing position is returned to the direction of the midline between the two reset magnets 41, and faces away from the center of the rotating disc 4 (that is, back to the original swing position), so that the cable fails to be stuck, and then the cable 3 can be retracted into the accommodating space of the cable winding structure. It can be learned from the foregoing description that when the magnetic toggle wheel 42 passes the limiting track 21, a limiting process is formed (the cable 3 is in a stuck state in this process), and further, a returning process may be triggered under the magnetic action (for example, a repulsive force or an attractive force) of the reset magnet 41 (in this process, the stuck state of the cable 3 fails, and the cable 3 is stuck).

As shown in FIG. 2, in some specific examples, a connecting column 11 is arranged on a middle portion of the bottom shell 1, and the connecting column 11 penetrates through the rotating disc 4 and bears the surface shell 2. Further, the winding mechanism 5 is wound around a section of the connecting column 11 that is located in the accommodating space, and the winding mechanism 5 is configured to cooperate with the rotating disc 4 to increase or reduce a length by which the cable 3 is wound. A length by which the winding mechanism is wound may be set according to actual situations such as experience or a full length of the cable 3.

In some specific examples, the bottom shell 1 and the surface shell 2 cover each other through a snap-fit structure; and an opening for extending or retracting the cable 3 is provided on a shell wall of the bottom shell 1 and a shell wall of the surface shell 2. Further, the snap-fit structure includes a recessed portion and a protruding portion 12 that interlock with each other. The recessed portion or the protruding portion 12 may be distributed on the bottom shell 1 or the surface shell 2. The interlocking with each other may refer to as a covering relationship of a vertical press-fit type or rotary snap-fit type. Further, to reduce costs of consumables or a weight of a finished product, the bottom shell 1, the rotating disc 4, and the surface shell 2 may all be made of plastic.

In conclusion, the cable winding structure in the embodiments of this application properly utilizes the mutual magnetism (for example, a force of mutual repulsion) between magnets to control the required outlet length of the cable, so that the cable 3 can be easily and conveniently stored, which avoids inconvenience of requiring additional power such as an external power supply or a built-in battery, as in a conventional way, to run a motor and further control the outlet length of the cable, thereby facilitating mass manufacturing and use.

The foregoing embodiments are merely used for describing the technical solutions of this application, but are not intended to limit this application.

What is claimed is:

1. A cable winding structure, comprising: a bottom shell, a rotating disc, and a surface shell that are sequentially arranged opposite to each other, wherein the surface shell covers the bottom shell;

an accommodating space, formed between the bottom shell and the rotating disc and configured to accommodate a wound cable;

a limiting track of a preset length, distributed on an inner wall of the surface shell; and a reset magnet and a magnetic toggle wheel, arranged on a surface of the rotating disc, wherein when the cable is pulled by an external force, the magnetic toggle wheel rotates with the rotating disc, and abuts against the limiting track that the magnetic toggle wheel passes, wherein the reset magnet is configured to adjust a swing position of the magnetic toggle wheel that abuts against an end of the limiting track to a position the same as that at which the magnetic toggle wheel does not abut against the end of the limiting track.

2. The cable winding structure according to claim 1, wherein the reset magnet is two magnets whose magnetic poles have a same name and that are arranged axially symmetrically with respect to the magnetic toggle wheel; and the magnetic poles of the reset magnet and the magnetic toggle wheel are the same.

3. The cable winding structure according to claim 1, wherein two reset magnets are disposed on left and right sides of the magnetic toggle wheel, and the magnetic toggle wheel is swingably disposed between the two reset magnets; and when the magnetic toggle wheel does not abut against the limiting track, the magnetic toggle wheel faces toward a direction of a midline formed between the two reset magnets, and faces away from a center of a circle of the rotating disc.

4. The cable winding structure according to claim 3, wherein one end of the magnetic toggle wheel is a rounded structure, and an other end of the magnetic toggle wheel is a sharp-cornered structure, wherein the rounded structure is arranged on the surface of the rotating disc through a rotation pivot, wherein the rotation pivot is located in a midline region formed between the two reset magnets; and a dimension of the sharp-cornered structure is adapted to a track gauge of the limiting track, to enable the cable to be stuck by the limited rotating disc.

5. The cable winding structure according to claim 4, wherein a magnet with same magnetic poles as those of the reset magnet is mounted inside the sharp-cornered structure.

6. The cable winding structure according to claim 1, wherein a connecting column is arranged on a middle portion of the bottom shell, and the connecting column penetrates through the rotating disc and bears the surface shell.

7. The cable winding structure according to claim 6, wherein a winding mechanism is wound around a section of the connecting column that is located in the accommodating space, and the winding mechanism is configured to cooperate with the rotating disc to increase or reduce a length by which the cable is wound.

8. The cable winding structure according to claim 1, wherein the bottom shell and the surface shell cover each other through a snap-fit structure; and an opening for extending or retracting the cable is provided on a shell wall of the bottom shell and a shell wall of the surface shell.

9. The cable winding structure according to claim 8, wherein the snap-fit structure comprises a recessed portion and a protruding portion that interlock with each other.

10. The cable winding structure according to claim 1, wherein the bottom shell, the rotating disc, and the surface shell are all made of plastic.

* * * * *